Feb. 5, 1935.  J. V. MARTIN  1,989,995
AUTOETTE
Filed Feb. 26, 1930   6 Sheets-Sheet 1
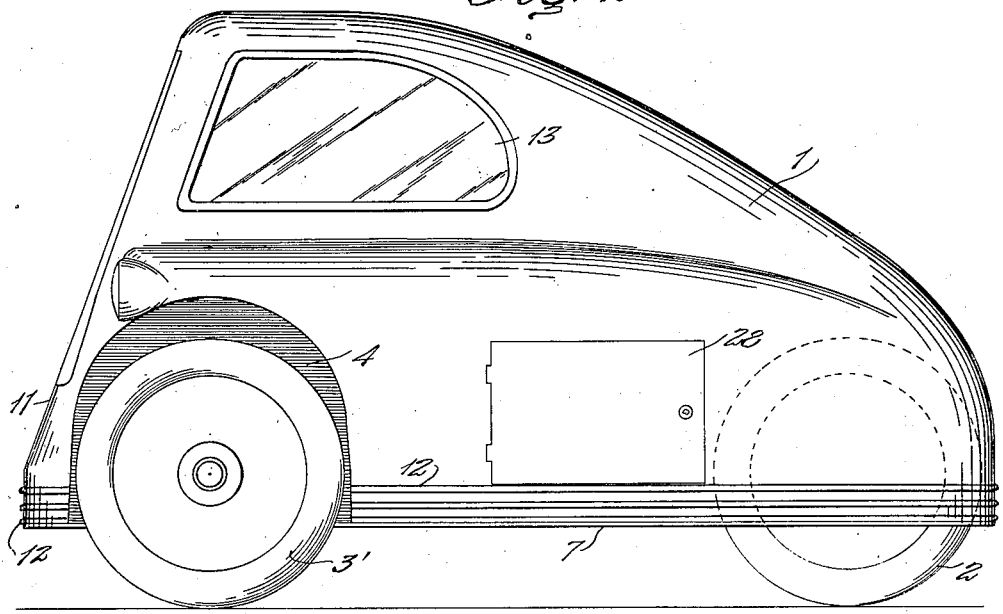
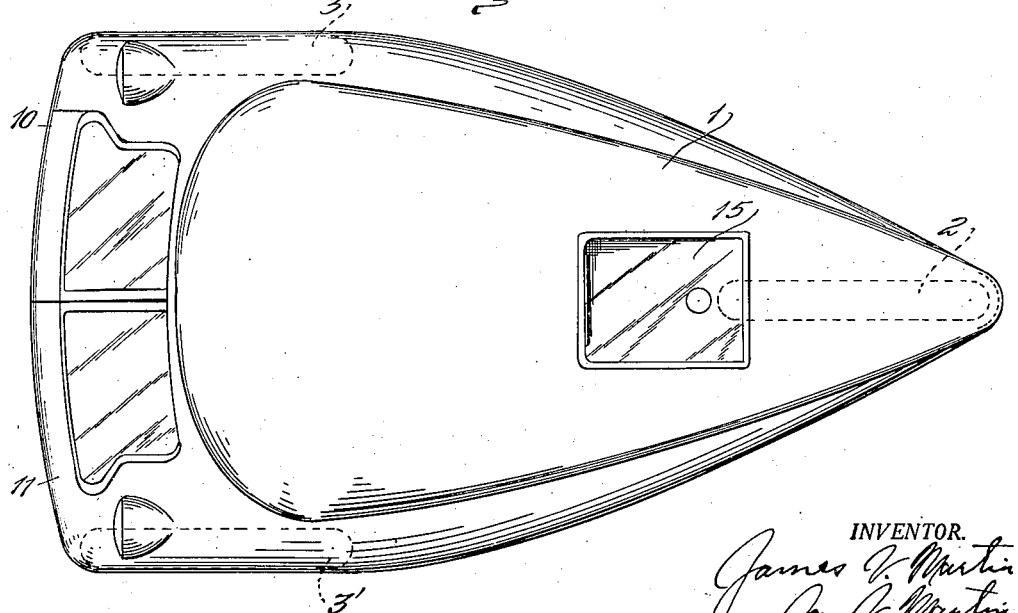
INVENTOR.
James V. Martin
Jas. V. Martin
ATTORNEY

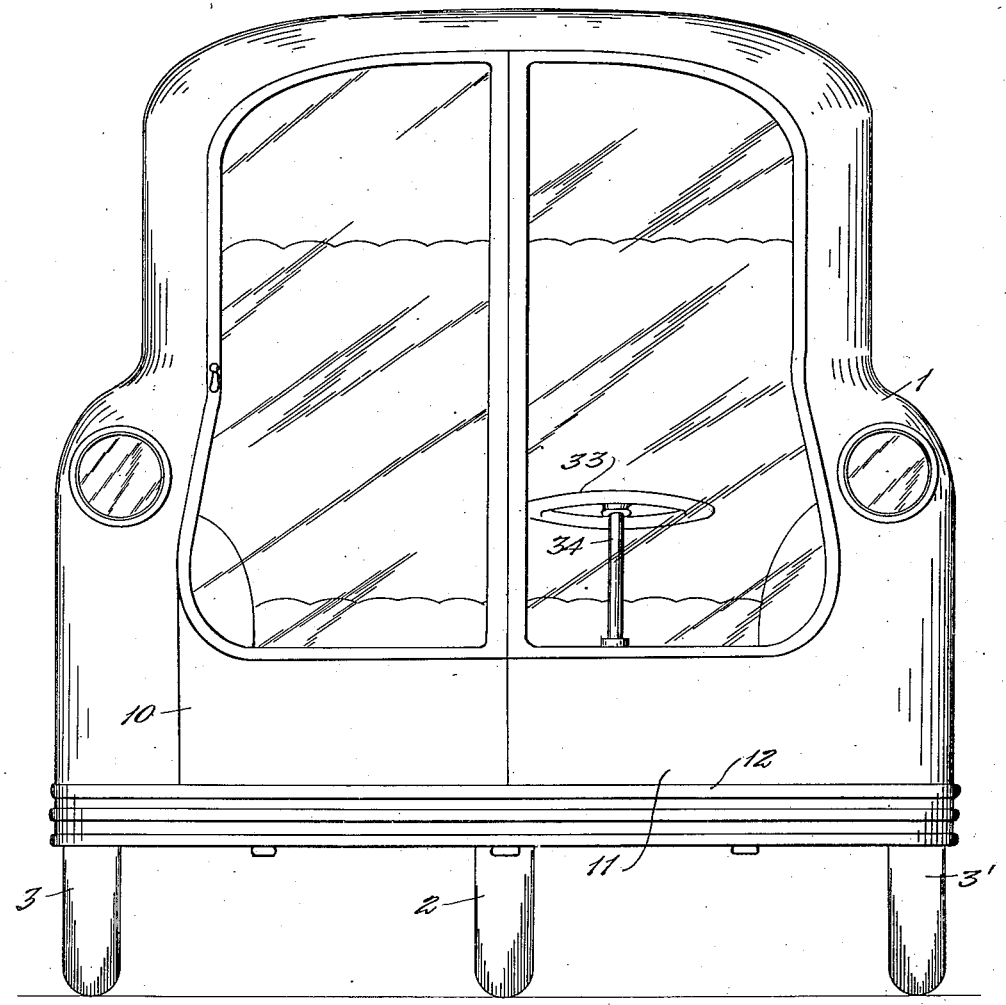

Feb. 5, 1935.     J. V. MARTIN     1,989,995
AUTOETTE
Filed Feb. 26, 1930     6 Sheets-Sheet 3

INVENTOR.
James V. Martin
Jas. V. Martin
ATTORNEY

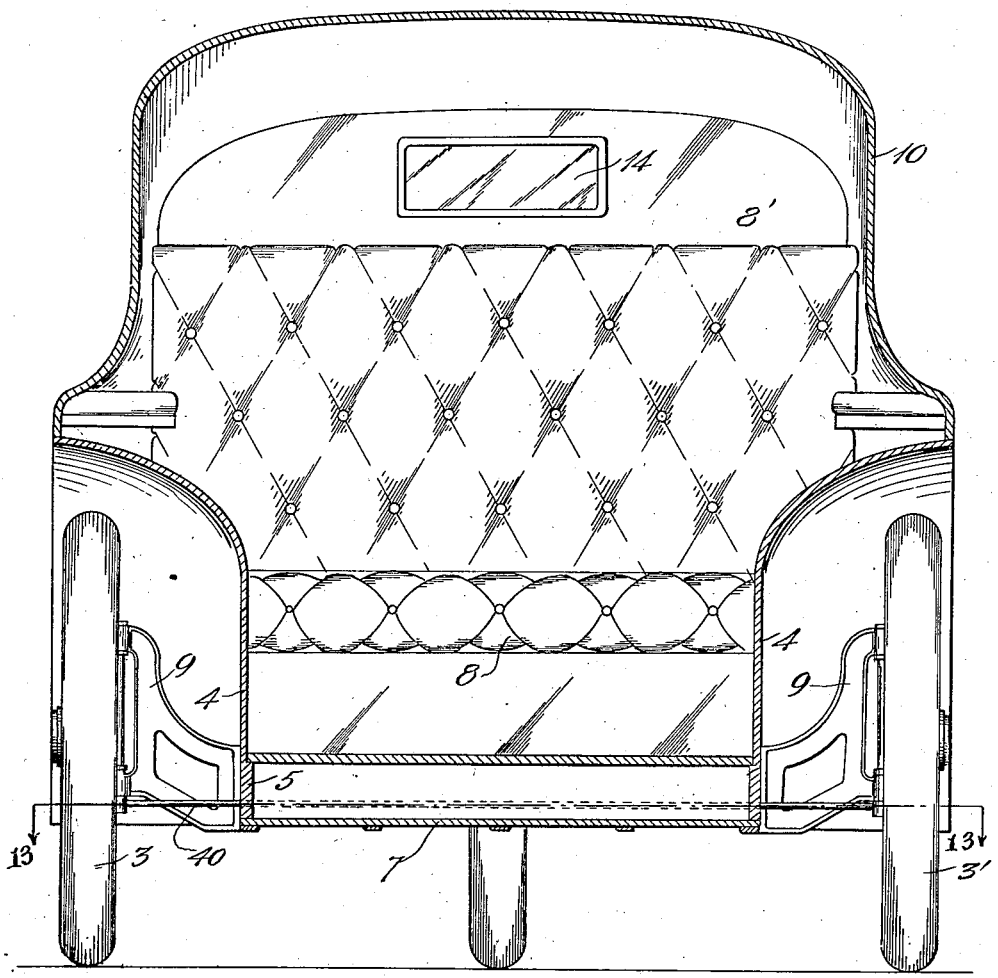

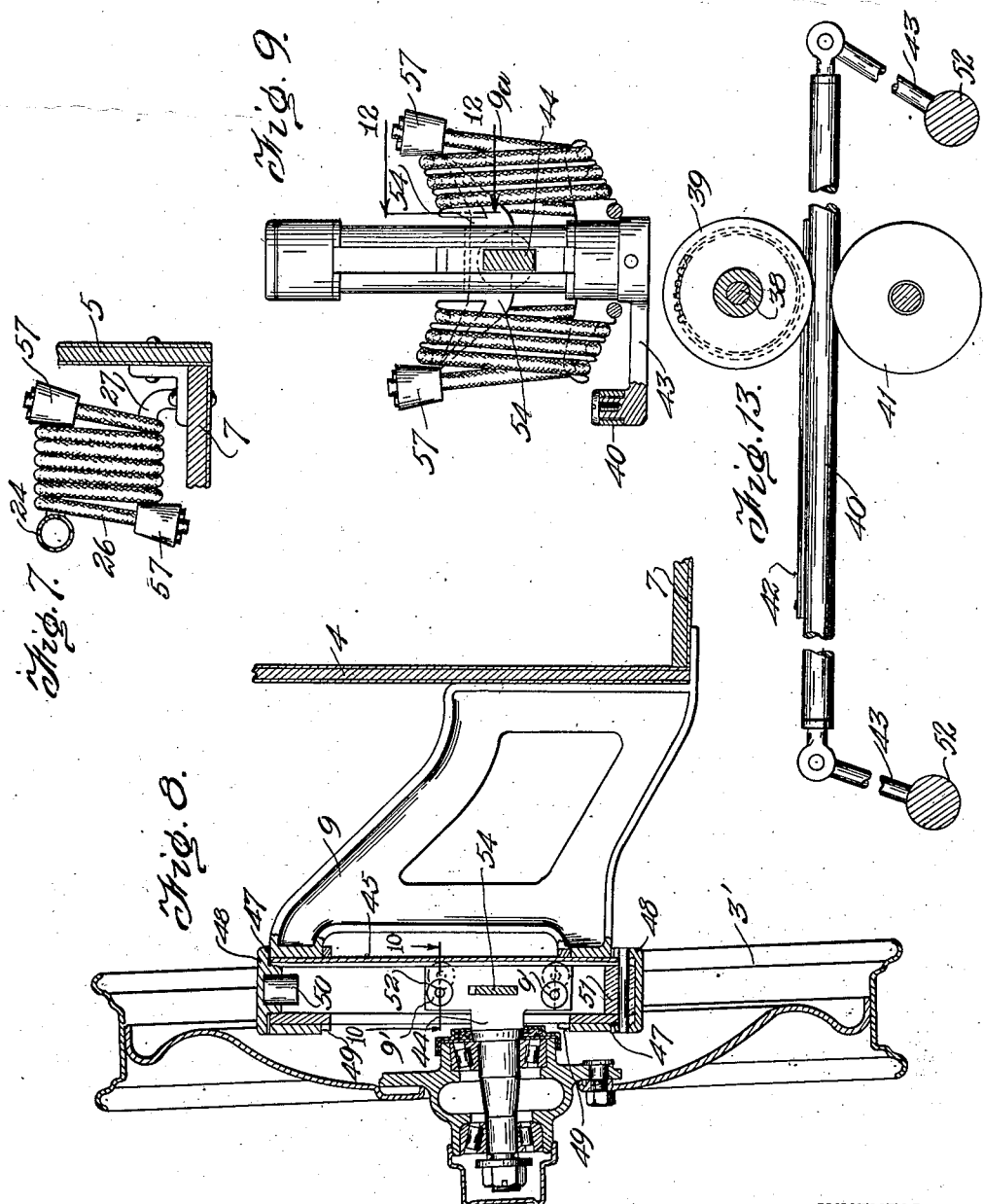

Feb. 5, 1935.  J. V. MARTIN  1,989,995
AUTOETTE
Filed Feb. 26, 1930   6 Sheets-Sheet 6
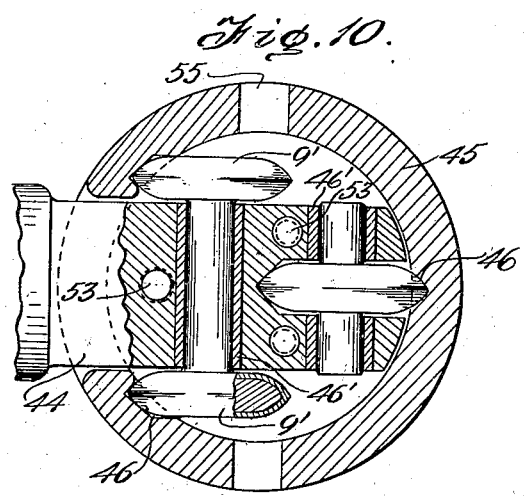
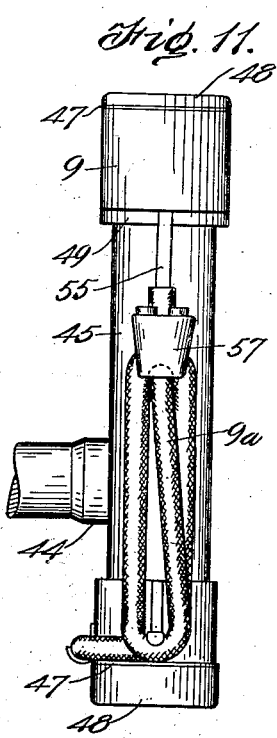
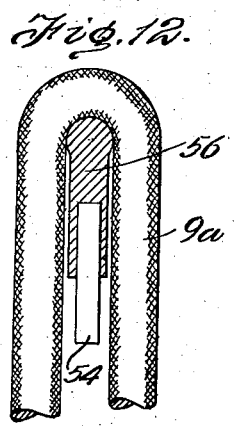
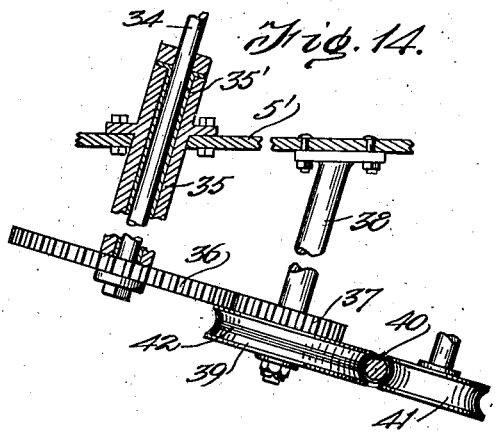
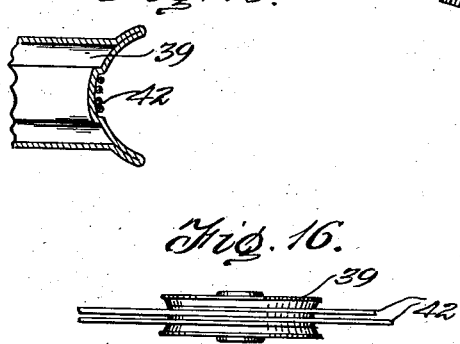
INVENTOR.
James V. Martin
ATTORNEY.

Patented Feb. 5, 1935

1,989,995

UNITED STATES PATENT OFFICE 1,989,995

AUTOETTE

James V. Martin, Martindale, N. Y.

Application February 26, 1930, Serial No. 431,617

27 Claims. (Cl. 180—25)

This invention relates to motor vehicles and aims to provide a simpler, more dependable and less expensive type of automobile than any heretofore known or used.

A further object of the invention is to lower the wind resistance of automobiles and to disclose new relationships of motor, passenger seats and wheel suspension and drive to further this object.

A further object is to improve the disclosures made in my Patents Nos. 1,432,771; 1,471,968; 1,546,500; 1,682,297 and 1,712,151 and my pending applications Serial Nos. 65,596 filed Oct. 29, 1925; 91,130, filed Feb. 27, 1926; 355,839, filed April 17, 1929; and 407,131, filed November 14, 1929.

Still further objects of my invention will become apparent as the description proceeds, reference being made to the drawings in which:—

Fig. 1 shows, in side elevation, one exemplification of my invention, while,

Fig. 2 shows the same in plan view, and

Fig. 3 shows the invention in front elevation.

Fig. 6 is an interior view in front elevation and partly in section taken forward of the front seat and wheels, but omitting for clearness the steering hand wheel and some other controls.

Figure 4:
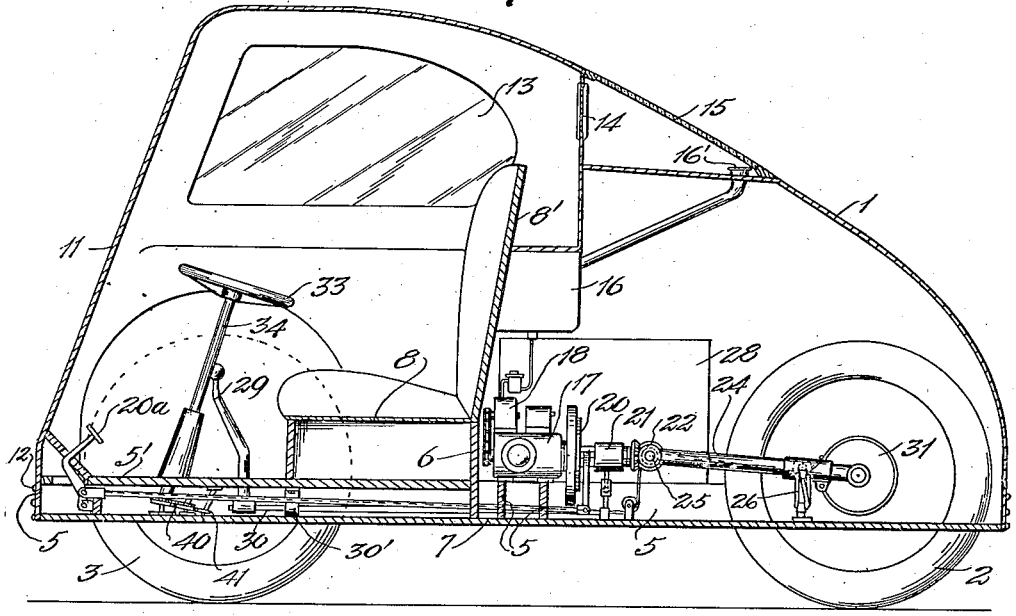
Fig. 4 is a view, partly in section taken along the lines 4—4 of Fig. 5, showing the interior arrangement of passenger seat and control and driving means for the vehicle
Figure 5:
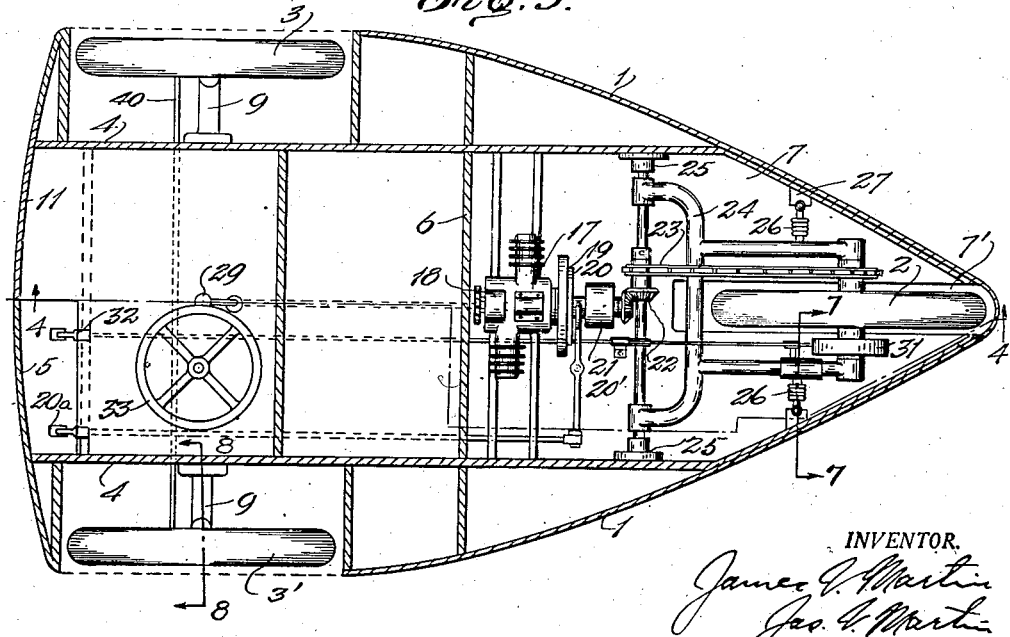
Fig. 5 is a plan view of the said interior, having arrows which indicate where the section lines of Fig. 4 are taken.

Fig. 7 is a view, partly in section along the lines 7—7 of Fig. 5, taken transversely to plane of rear wheel rotation in Fig. 5 and just forward of bracket 27, showing how the rear wheel suspension on one side of the autoette is attached to the lower body portion, and Fig. 8 is a view, partly in section on lines 8—8 of Fig. 5, showing the front wheel guide bracket as it would appear from the eye located to rearward and looking forwardly at the left hand wheel: Fig. 9 is a side view of the guide bracket shown in Fig. 8 as seen from the wheel side and with the steering tie rod lever partly in section.

Fig. 10 is an enlarged plan view, partly in section on lines 10—10 of Fig. 8, looking down upon the rollers indicated at cap 52 of Fig. 8 and showing details of the guide bracket rollers and Fig. 11 is a side elevation showing the rubber cords in position upon the said guide bracket.

Fig. 12, is a view, partly in section on lines 12—12 of Fig. 9 of the upper arm shown in Fig. 9 and showing the radiused saddle which hold the rubber cords upon the said bracket.

Fig. 13 is a plan view, partly in section through split cap 52, see Fig. 8 and along lines 13—13 of Fig. 6, showing the steering tie rod and operating mechanism, while Fig. 14 is a side elevational view, partly in section through wheels 39 and 41 of Fig. 13 and showing the said steering mechanism and Fig. 15 shows an enlarged sectional view of one of the tie rod operating pulleys and Fig. 16 another view of the same pulley.

Proceeding now to the more detailed description of my invention in which like characters designate like parts throughout the several views, 1 indicates the external partially streamline cover of my autoette having a rear drive wheel 2 and right and left steering wheels 3 and 3' respectively.

In place of the conventional chassis with its heavy steel frame and cumbersome steel springs to which the comparatively weak sill of a body is fastened, my invention contemplates a box-like structure or reinforced sill substituting for both the conventional chassis and for the conventional body sill. As is well known to automobile engineers, the conventional chassis warps badly due to the uneven roads combined with the twisting of the leaf springs and the inflexible type of "through" axle and the body mounted upon a comparatively light sill is badly stressed by the said warping and twisting of the chassis.

My invention, see Figs. 4, 5, 6 and 8, provides a box-like structure or sill extending from the foremost part of the body and forward of the two steering wheels to a point rearward of the rear wheel.

This sill is built up of vertically placed members 5, including that portion of the body side walls 4, which lies in the planes between the floor 5', which forms the upper part of my sill and the lower cover of the auto 7, which forms the bottom member of my sill. This bottom member, while not curved as most streamlined surfaces are, serves the double purpose of forming an essential part of the truss of the aforesaid sill and also conduces a smooth flow of air between the auto bottom and the ground, thus reducing air resistance appreciably. The seat 8 also unites with the said sill and adds to the strength of the lower body bottom, while its position well forward, made possible by my novel arrangement of forward door and individual wheel springing permits the center of gravity of the auto to be further forward, between the front wheels, than is possible in anything known in the art so far.

In order to make the auto ride comfortably over uneven roads I avoid the conventional practice of passing axles or other forms of inter-wheel connections and provide a guide bracket 9 rigid with the side walls 4, and these brackets have rollers 9', Figs. 8 and 10, to permit easy vertical movement yieldably carrying the body upon the rubber cords 9a. Thus when a wheel comes over a rut or obstruction in the road it is free to travel down or up through a comparatively wide range without disturbing the position of the opposite wheel or twisting or straining the body.

The entire auto is covered with an external covering 1, designed to protect the occupants and machinery and at the same time reduce the wind resistance of the automobile: This wind resistance amounts to about half of the available horse-power consumption at fifty miles per hour and in some conventional cars consumes as much as three fourths of the entire horse-power at 75 miles per hour speed. While I am by no means the first to apply the principles of streamlining to automobiles, I claim to be the first to make streamlining practically effective, especially for closed body type passenger cars: Heretofore designers have failed to keep the rear ends of their cars smooth and in some cases by carefully building up an even flow of air along an otherwise smooth body they have actually caused greater resistance than the conventional car by abruptly shooting the air into vortices by protruding obstructions such as the rear wheel fenders etc. I avoid this by carrying my streamline cover smoothly over the rear wheel or wheels from points outside of the normal positions of the front wheels. Also I am by using only one wheel in the rear as shown in Figs. 2 and 5 to taper the streamline in an approved fashion: The use of three wheels is also old in the art, but heretofore they have been disadvantageously associated with the passenger seats and load, i. e., either the two passenger seat has been placed in the rear with a wheel at each end and the third wheel forward where the momentum at speed tends to overturn the car on turns or if the wheels are placed, as I place them for safety at speed on turns, then it has been practice to place the motor between the two wheels and to place the two passenger seat over or near the single rear wheel, but obviously this produces an unbalanced condition especially when only one is riding and prevents using so light a car as I can use by my novel arrangement of placing the passengers and motor in a reversed relationship. In the few instances where designers have shown this arrangement of seat and wheels they have failed to provide the needed safety on turns by front wheel steering and a low center of gravity placed well forward, to do this my double bottom below the steering wheel centers, made possible by the sprung tie-rod and guide brackets, affords my passengers a smooth floor (without tripping over the tie-rod) from seat to front door.

A door 10 opens outwardly from the front 11 of the car thus permitting great economy of parking space, while the wearing streaks, or guard strips, 12 allow one car to actually touch another without danger of injury to either. Vision is through glass in the door and in front of the driver and through the side windows 13 and the glass is shown as curved (see Figs. 1 and 2) to conform with the wind reducing body shape, while through 14 and 15 a view aft can be had. The glass skylight panel 15 is hinged and can be lifted to permit filling the gasoline tank 16 through filler cap 16'. The back of the seat 8' helps in trussing the body and in forming an air tight and sound deadening partition separating the motor compartment from the passenger part of the car; space for parcels is located back of the top of the seat 8'. Attention has been given to streamlining where it is most important, i. e., at the rear and on the bottom of the automobile, while for practical reasons, such as conserving street space and vision, the front and sides are comparatively straight. The rear upper part of the body is curved in two directions and the skylight 15 conforms to these curves as disclosed in Figs. 2 and 4.

The car is propelled by any type of power unit, a double opposed gasoline motor 17 being shown as firmly bolted to the reinforced sill 5 of the car and carrying, as a unit with it, the self starter 18, the flywheel 19, the clutch 20 and the transmission 21.

The drive from the three speed and reverse transmission 21 is through a bevel gearing 22 and chain 23 or alternative construction to the rear wheel 2 which is carried by the journalled frame 24 journaled in brackets 25 carried by the sill of the body, while the weight of the rear end is yieldably taken by the elastic cords 26 holding the frame 24 down to the body sill by brackets 27 attached rigidly thereto. An aperture 7' permits the wheel to move freely up and down through the bottom closure 7, and an opening with a door 28 permits access on both sides to the motor and to the wheel 2; this opening can be enlarged to afford space for removal of the rear wheel 2. The transmission is operated in conventional manner by the hand lever 29 which slides the rod 30 fore and aft in the bracket 30' and also turns it in the said bracket to operate the ball socket type connection 30a adjacent the transmission 21. A suitable brake 31 is operated by foot lever 32 around axis 25.

The invention involves simplified means of steering from a hand wheel 33 held on a turnable column 34, which passes through the floor 5' and an oil impregnated bushing 35' in a bracket 35 to a gear wheel 36 which drives another gear 37 about axis 38 to drive steering pulley wheel 39 which pinches tie rod 40 between itself and an idler pulley 41. The pulley 39 also carries two sets of flexible cables 42 which insure against slipping and make positive the operation of the tie rod 40 by the pulley 39.

The tie rod 40 does not move up and down with the wheels 3 and 3' as in conventional cars, but is journalled to the lever 43 at the lower end of guide bracket 9, see Fig. 8. This feature permits the use of the tie rod for direct connection with the steering gear for steering and protects it within the inclosed sill of the body from injury from stones on the road.

Sliding bushings have proved troublesome in wheel brackets because they must be kept free from dirt and oiled while permitting various kinds of movement between the wheel spindle 44 and the bracket 9, I have therefore improved my former disclosures by placing rollers 9' having rubber tires to provide silent frictionless vertical movement for the spindle part 44 within a tube 45 which has tracks 46 into which the rollers fit so that they will turn the spindle 44 when the tube 45 is steered by the tie rod lever 43. The tube 45 is held by bracket 9 so it can turn on oil impregnated bushings 47 and within the forks of bracket 9, the cap 48 and the inset rings 49 holding it in place and a rubber bumper 50 limiting its movement downwardly relative the wheel while rubber bumper 51 so limits rebound.

The rollers are provided with antifriction bushings 46' the cross head end of the spindle part 44 carries three rollers at its top and three at its bottom set in by a split cap 52 held in place by machine screws 53 and carries two arms 54, which protrude through slots 55 in the wall of tube 45 and which have saddles 56 for the rubber cords 9a and wedging means 57 at their ends to hold the said rubber cords. The body reinforced sill or lower portion may be made up of plymetal see 4 and 7 as shown in Fig. 8 or of reinforced sheet metal.

Thus it will be seen that I have disclosed a simple rugged type of automobile, which operates with a low center of gravity in spite of the ample headroom inside, this is obtained by attaching the brackets 9 to the reinforced sill having an integral upper floor and lower cover to hold the wheel in its plane of rotation and at the same time provide between the wheel centers an unobstructed space for the passenger's feet, free from the usual vertically moving tie-rod and axle. It will also be observed that the forward placing of the passenger seat moves the center of gravity ahead, so that it comes much nearer the front wheel's center than otherwise and this gives rise to the need for a front door with at least its lower part forward of the front wheels: Guard strips have been used before, but I blend them with the streamline body so as to improve the airflow and at the same time strengthen the body bottom where the bottom cover reacts to resist impact blows from collisions etc. It will be observed that one may put his feet on the floor directly over my type steering tie-rod and by bouncing up and down, his feet will move up and down between the wheel centers.

Having thus explained the invention and the best method of its application, it will be evident that wide latitude of adaptation may be had without departing from the teaching and I do not limit the invention to the specific forms shown, but what I claim as new and desire to protect by Letters Patent is:—

1. In combination with a three wheeled automobile having a single drive wheel at the rear, a double body bottom extending horizontally below the centers of two steering wheels, a tie-rod connecting the said wheels and passing through the said bottom, the said body yieldably mounted on both sides of the rear drive wheel.

2. A combination according to claim 1 and means within the said body double bottom to connect the said tie-rod with the steering column to steer the said wheels.

3. A combination according to claim 1 and the upper portion of the said rear drive wheel inclosed within the said body.

4. The combination in a three wheeled automobile of two forward steering wheels and one centrally located rear drive wheel, a reinforced body sill extending from a point forward of the said wheel's centers past the said centers to a journalled frame attachment for the said rear wheel and rubber bands yieldably supporting the said sill on the said frame.

5. The combination of an automobile body, a body sill including a floor, two forwardly located steering wheels, the said floor, forming the top of the said sill and said sill yieldably supported on the said wheels, a passenger seat partly located between the said wheels and connected to the said sill, a motor to rearward of the said seat and a third and centrally located wheel yieldably attached to the said sill.

6. A combination according to claim 5 and a door located at the forward end of the said floor.

7. A combination according to claim 5 and the side and front walls of the said body extending outwardly beyond the said wheels and carrying a guard strip in the approximate plane of the said wheel centers.

8. The combination in a three wheeled auto of a reinforced body sill providing a journalled support for each wheel, two of the said supports at the front having a vertical axis and rubber carrying the car load parallel with the said axis and a third and rear support having a horizontal axis and rubber carrying the said load at substantially right angles to said axis.

9. An automobile having a body and two steering wheels, each guided for vertical yieldable movement on a bracket, a wheel spindle carrier located within a rotatable sleeve, a tie-rod arm rigid with the lower part of each sleeve, a double bottom for the said automobile forming a rigid connection for the said brackets and a tie-rod passing through the said double bottom and connecting the said arms.

10. A combination according to claim 9 and the upper side of the said double bottom forming the floor of a passenger compartment directly over the said tie-rod.

11. In an automobile having two forwardly located steering wheels, and guide brackets inclosing roller guides, a floor extending between the two said wheels and forming part of a body sill, and continuing as a smooth surface forward and aft of the said wheel's centers and yieldably moving on the said vertical guide brackets up and down below the said wheel centers.

12. A combination according to claim 11 and a steering tie-rod located under the said floor and steeringly connected with a steering column and participating with the said floor in said yieldable movement.

13. The combination of an inclosed auto body supported on two forward steering wheels and one rear drive wheel, each said steering wheel yieldably mounted and journalled to turn on a bracket within a wheel housing partially surrounding the upper parts of the said wheels, from a point below their centers and roller guides holding the said wheels in given planes of rotation.

14. A combination according to claim 13 and a double body bottom affording a rigid attachment for the said bracket, and said bottom extending from a line forward of the said steering wheel housings to a passenger seat located at the rear of the said housings.

15. In combination in an auto, a body with a double bottom sill and road wheels supporting the said sill yieldably by means of inclosed roller guides for vertical guided movement.

16. A three wheeled auto having a body with a double bottom sill, body brackets, and two forwardly located steering wheels, each said wheel independently mounted upon rollers guided for vertical travel within one of the said brackets, rubber means to resist vertical displacement between said sill and wheels and a rearwardly disposed drive wheel yieldably attached on both sides to the said sill.

17. A three wheeled automobile having a body and two steering wheels located one on each forward corner of the said body, a door forward of the wheel axles, a seat rearward thereof and a body floor passing substantially horizontally from the said door below the said wheel axles to the said seat and providing unobstructed space for passenger's feet over said floor and metal brackets connecting each said steering wheel to the said body to inflexibly hold the said wheels in given planes of rotation and guide theme for yieldable vertical movement.

18. In an automobile, a body, two forwardly located wheels, means for individually and yieldably supporting the said body on the said wheels, a passenger seat partly located between the said wheels and lower than the tops of the said wheels and bracing the closed upper part of the said body, a package compartment to rearward of the said seat and the said top of the body tapering rearwardly from said seat and forming a cover for the said compartment.

19. In an automobile body, a body sill including a floor, two forwardly located steering wheels, means for individually and yieldably supporting the said wheels on said sill by means of rubber, a frame journalled at the rear of the said sill and a drive wheel centrally supported on said frame also by means of rubber.

20. In combination with a three wheeled automobile, two forwardly located and yieldably attached steering wheels and one centrally located drive wheel, a reinforced sill extending on both sides from a point forward of each said steering wheel to a part adjacent the center of the said rear wheel, a frame carrying the said drive wheel and journalled at its forward end to bearings located on the said sill and rubber tension means for yieldably supporting the said sill on the rear end of the said frame.

21. The combination of a closed automobile body having a double bottom sill and road wheels, brackets rigid with the said sill and providing an inclosed vertical guide and a stub-axle part for each wheel vertically movable on rollers within the said guides.

22. In an automobile, a closed streamlined passenger body provided with forward wheel housings, road wheels individually sprung to the lower part of the said body, a passenger seat partly located between and bracing the said wheel housings and said seat below the upper parts of the said forward wheel housings and the said body provided with a top tapering to rearward over the said seat and provided with a skylight to provide rearward vision in line with the driver's eyes.

23. In an automobile body, a body sill including a floor, two forwardly located steering wheels, means for individually and yieldably supporting said wheels on said sill by means of rubber, a frame journalled at the rear of the said sill and a rear drive wheel centrally supported on said frame by means of rubber.

24. A three wheeled automobile having a streamlined body yieldably and individually suspended upon the said wheels, a passenger seat bracing the wheel housing walls of the said body, a passenger door in the said body located forwardly and upwardly of the two forward wheels and said body providing an unobstructed space in the region of the said wheel's centers for passenger's feet.

25. In combination with an automobile having road wheels, an inclosed passenger body yieldably suspended upon said wheels, a passenger seat located below and between the tops of the two forward road wheels, a passenger door having its lower portion located forward of the said forward wheels and the said body tapering to a position at the extreme rear of the said automobile.

26. A three wheeled automobile including a rearwardly disposed drive wheel, a closed passenger body, a double bottom body sill and a body surface tapering in streamlined external form from a comparatively great dimension forwardly to slight rearward dimensions, the said surface rigid with the said double bottom body sill and extending rearwardly from a point laterally outward of each steering wheel and said rigid surface carrying converging guard strips past said drive wheel, the latter being yieldably journalled.

27. A three wheeled automobile having two forward wheels, one rear wheel and a closed passenger body with side walls extending rearwardly from points laterally beyond the said forward wheels and converging at rear of the said automobile, said side walls also extending forwardly of the said forward wheels and being curved into a comparatively blunt forward body portion and said portion provided with a curved passenger door.

JAMES V. MARTIN.